UNITED STATES PATENT OFFICE.

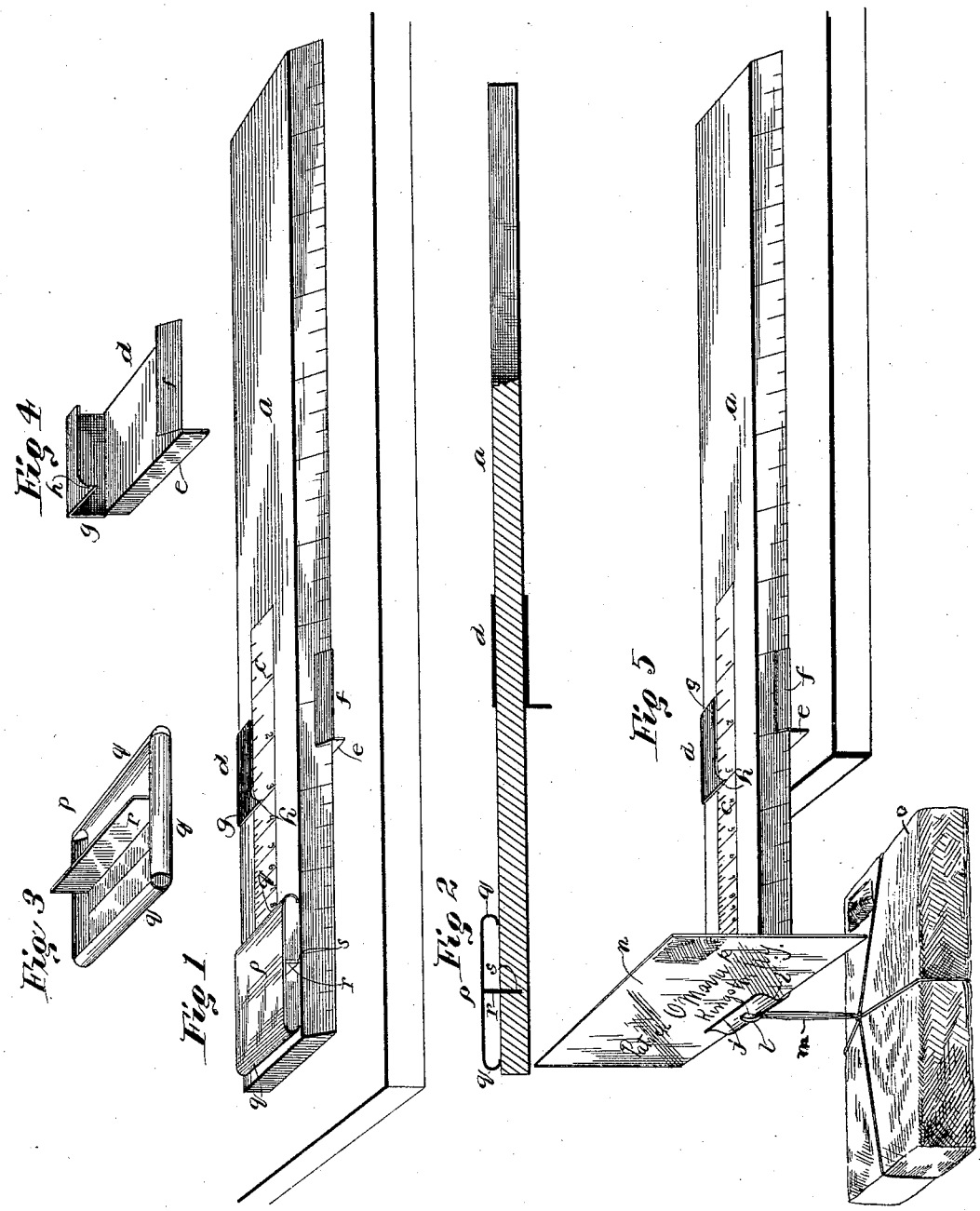

PATRICK A. O'MARRA, OF KINGSTON, NEW YORK.

PAPER-WEIGHING SCALES AND DESK-RULER COMBINED.

SPECIFICATION forming part of Letters Patent No. 440,959, dated November 18, 1890.

Application filed May 29, 1890. Serial No. 353,606. (No model.)

*To all whom it may concern:*

Be it known that I, PATRICK A. O'MARRA, a citizen of the United States, residing at Kingston, in the county of Ulster and State of New York, have invented certain new and useful Improvements in Weighing-Scales; and I do hereby declare the following to be a full, clear, and exact description of the invention, such as will enable others skilled in the art to which it appertains to make and use the same.

This invention has relation to an improvement in weighing-scales, but contemplates more particularly a combined mail-weighing scale and desk-rule or similar article; and the object sought to be accomplished is to so combine these two useful articles in one as to produce an exceedingly simple, cheap, and useful device which can be conveniently and effectively employed.

With these ends in view my invention consists in certain peculiarities of construction and combinations of parts more fully set forth hereinafter, and pointed out in the claims.

Referring to the accompanying drawings, Figure 1 is a perspective view of my complete device; Fig. 2, a longitudinal section; Figs. 3 and 4, detail views, and Fig. 5 a modification.

The reference-letter $a$ indicates an ordinary straight-edge rule of any length, and on the top face of this rule and lengthwise therewith is marked a scale $c$, denoting ounces and fractions thereof, in the denominations required for weighing letters and other mail-matter and running up as high as the weight of the rule will allow. The rule itself forms the scale-beam, and upon it is arranged a slide $d$, consisting of a base-plate fitting against the under side of the rule, its front edge being turned down at right angles to form a strip $e$, extending the width of the rule and constituting the fulcrum or pivot for the scale-beam. One side of the slide is turned up and back against the beveled edge of the rule at $f$, while the other side is doubled over the opposite edge of the rule, the strip $g$ thus formed lying against the upper face of the rule along the edge of the scale $c$ and provided with an indicator or finger $h$ at one end, extending over said scale to register with the marks thereon. I provide a platform $p$ at one end of the rule, which consists of a flat piece of tin or other suitable material having its ends $q$ turned under to form rounded edges just clearing the surface of the rule. The platform is mounted at its middle on a suitable standard $r$, formed of a straight strip of suitable rigid material and arranged to fit in a transverse slot or depression $s$ in the rule, having a sufficient depth to hold the platform steady when mail-matter is placed upon it to be weighed.

In the modification shown in Fig. 5 the mail-holding device consists of a plate $i$, inlaid at one end of the ruler on its under side and projecting therefrom. This plate is formed of thin spring metal and its projecting end is turned up to form a lip $j$, bearing at its upper edge against the end of the rule, and thus forming with it a clasp in which a letter $n$ can be inserted and held. The lip $j$ is cut out in the center to form an opening $k$, a lug or hook $l$ being left in the middle of this opening on which can be hung by suitable connections $m$ a package $o$ to be weighed.

The operation of this device will be apparent, and can be briefly stated as follows: The slide $d$ is slipped on the rule with the pivotal strip $e$ resting upon any suitable level surface, and the letter or package will be placed upon the platform $p$. Now the slide, and hence the fulcrum, will be moved along until the scale-beam balances, when the indicating-finger $h$ will denote by the scale $c$ the weight of the article on the end of the rule. When a package is weighed by the arrangement shown in the modification, Fig. 5, the device will be placed at the edge of the desk or in a similar position, so that the package can depend freely from the holder $i$. It will be seen that with a correct marking of the scale in relation to the weight of the rule an accurate result can be obtained by use of this device. By this arrangement two articles indispensable to the desk of a business man are combined in one, and the result is a simple, inexpensive, and exceedingly convenient and serviceable device, and, moreover, both attachments are removable, so that the rule can be used by itself, if desired, for the usual purposes.

It is of course evident that other devices than a straight-edge desk-rule, such as shown, could be employed in connection with my attachments as a triangular scale, or, in fact, a straight strip of any material or form, and it is also evident that many other slight changes in the device for holding the mail-matter and the other details which might suggest themselves could be made without departing from the spirit and scope of my invention, and hence I do not limit myself to the precise construction herein shown, but consider myself entitled to all such slight variations.

Having thus described my invention, what I claim as new, and desire to secure by Letters Patent, is—

1. The combination of a suitable article constituting a scale-beam, a detachable slide partially encircling said beam and arranged to travel over the scale marked thereon, and a projection from said slide arranged to rest upon a suitable flat surface and form the fulcrum of the scales, substantially as described.

2. The combination of a suitable article constituting a scale-beam, a slide fitting around the latter and detachable therefrom, an indicating-finger forming part of said slide, and arranged to travel over the scale marked on the beam, and a projection from the slide, arranged to rest upon a suitable flat surface and form the fulcrum of the scale, substantially as described.

3. The combination, with a rule having a suitable scale marked thereon, of a detachable slide fitting around said rule and having an indicator traveling over said scale, a projection from said slide arranged to rest upon a suitable flat surface and form the fulcrum of the scales, and a detachable mail-holding device, substantially as described.

4. The combination of a suitable article constituting a scale-beam, a slide operating thereon and comprising both the fulcrum and indicator, a standard removably fitting a transverse depression in said scale-beam, and a platform mounted on said standard, substantially as described.

In testimony whereof I affix my signature in presence of two witnesses.

PATRICK A. O'MARRA.

Witnesses:
CHAS. A. MCCANN,
MARTIN O'MARRA.